J. H. ASH.
KITCHEN RANGE BOILER.
No. 47,783. Patented May 23, 1865.
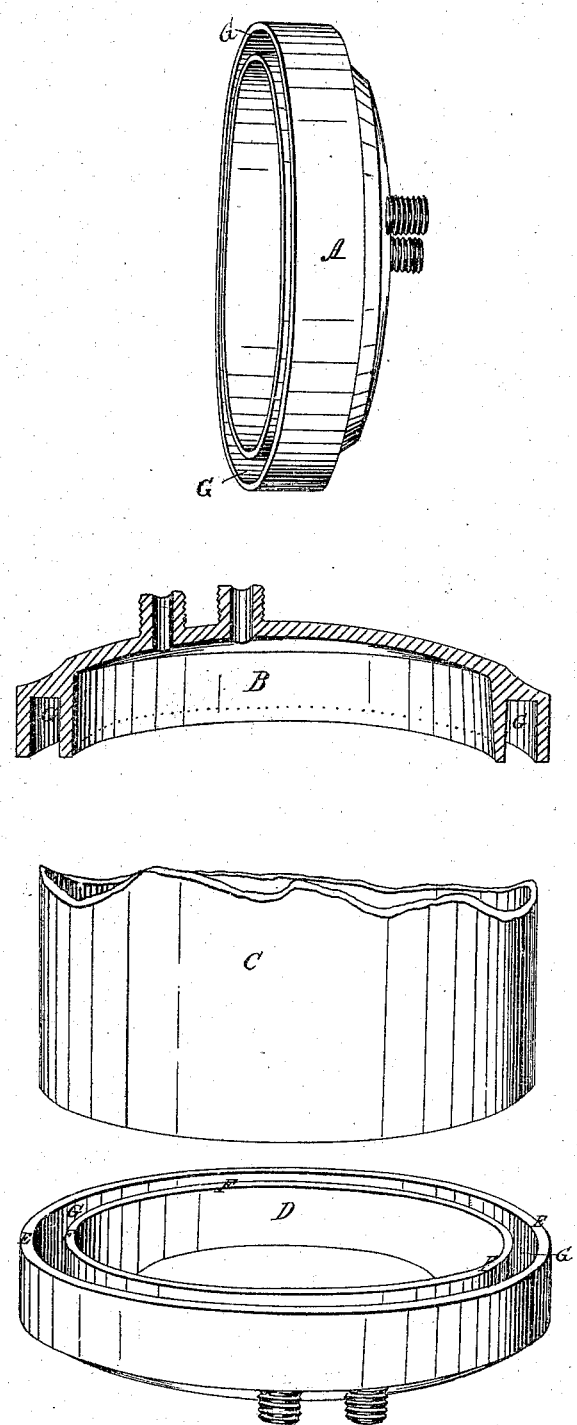

UNITED STATES PATENT OFFICE.

JOSEPH H. ASH, OF BROOKLYN, NEW YORK.

IMPROVED KITCHEN-RANGE BOILER.

Specification forming part of Letters Patent No. 47,783, dated May 23, 1865.

*To all whom it may concern:*

Be it known that I, JOSEPH H. ASH, of Brooklyn, in the county of Kings and State of New York, have invented a new and useful Improvement in Construction of Copper Boilers for Kitchen-Ranges; and I do hereby declare that the following is a full, clear, and exact description thereof, which will enable others skilled in the art to make and use the same, reference being had to the accompanying drawings, forming a part of this specification.

The present invention relates to a certain new and useful improvement in the mode of construction of copper boilers for kitchen-ranges; and it consists in forming around and on the boiler-heads, which may be either cast in a mold or made of sheet copper, a circular or any other suitable shaped groove, according to the exterior periphery of the boiler-cylinder, to receive the ends of the body, and in which they are soldered by the use of the ordinary solder employed for copper. Heretofore in the manufacture of these boilers the head-pieces have been soldered to the body by simply placing them within the cylinder at each end, and then the ordinary solder applied at their joints, and which, in order to insure any considerable degree of strength to resist the expansion or contraction of the metal, according as the boiler was heated or cooled, required the use of a large amount of solder, thus being quite expensive; and, moreover, even then sufficient strength could not possibly be imparted to the boiler as to keep it tight for any great length of time, it often breaking away at its joints, requiring to be frequently repaired and resoldered, the annoyance, inconvenience, and expense of which are manifest to all persons.

By the present invention, however, I not only have remedied and removed the principal objections to copper boilers as heretofore constructed, owing to the frequent breaking away of their joints, as above described, but also thereby produce a boiler capable of sustaining a greater pressure and a higher degree of heat as well as less expensive in manufacture, wearing a much longer time, and seldom, if ever, requiring to be repaired, &c.

In the accompanying plate of drawings my improvement is represented, of which Figure 1 is a perspective view of the head of a copper boiler made upon my improved plan; Fig. 2 a section through the same; and Fig. 3 a perspective view of the inner surface of the boiler-head, showing a portion of boiler-body.

A, in accompanying drawings, represents one head of a boiler, made of any desired size, shape, and of copper, either cast or sheet, having upon its inner surface two concentric projecting lips or rims, E and F, one within the other, extending entirely around the same and at an equal distance apart throughout their entire length, thus forming a uniform groove, G, between the inner faces or surfaces thereof. A similar groove, G, is formed in the other head, and when the boiler is put together each end of its body C is inserted in the respective groove of its head, in which previously was placed a sufficient amount of solder to firmly and securely hold the body therein.

By forming the boiler in the manner above described, it is manifest that an equal resistance is exerted by the boiler-head to both the expansion and contraction of the boiler-body, the outer rim in the former and the inner in the latter receiving and resisting the expansive or contractive force of the body, a result never before accomplished in copper boilers, they being heretofore, by their construction, capable of resisting only one of these two strains which necessarily must come upon them by their use—that is, the boiler-body was either soldered within and to the interior surface of a projecting rim or to the exterior surface thereof—whereby, as is perfectly evident, that when the body was acted upon by a force in the opposite direction to its joint, said action tended of course to separate and open the same.

I am aware that a cast-iron head has been made with a projecting rim or lip on its inner surface, against and around which the boiler-body is placed and there securely held by the shrinking in any proper manner of a wrought-iron band around the exterior of the same; but it is plainly evident to all conversant with metals such a mode of attaching a boiler-body to its head could not be adapted or in any manner applied to the manufacture of copper boilers, and even if possible would not prove practical or of any great advantage over the ordinary method.

The boiler-heads, as hereinbefore stated, can be made either of cast or sheet copper, but when made of the latter the inner rim is brazed to the head.

Having thus described my invention, I claim as new and desire to secure by Letters Patent—

The improvement herein described in the manufacture of copper-boilers, the same consisting in forming in each head of the boiler a suitable groove or channel hhaving parallel concentric walls perpendicular to the bottom, extending entirely around the same, in which the body of the boiler is placed and soldered in any proper manner, substantially as above described, and for the purposes specified.

JOSEPH H. ASH.

Witnesses:
 LEOPOLD BRANDER,
 M. FOSTER.